US012580246B2

(12) United States Patent (10) Patent No.: US 12,580,246 B2
Kim et al. (45) Date of Patent: Mar. 17, 2026

(54) BATTERY PACK AND DEVICE INCLUDING THE SAME

(71) Applicant: LG Energy Solution, Ltd., Seoul (KR)

(72) Inventors: Min Seop Kim, Daejeon (KR);
Junyeob Seong, Daejeon (KR);
Myungki Park, Daejeon (KR)

(73) Assignee: LG Energy Solution, Ltd., Seoul (KR)

( * ) Notice: Subject to any disclaimer, the term of this
patent is extended or adjusted under 35
U.S.C. 154(b) by 840 days.

(21) Appl. No.: 17/760,549

(22) PCT Filed: Mar. 11, 2021

(86) PCT No.: PCT/KR2021/003036
§ 371 (c)(1),
(2) Date: Mar. 15, 2022

(87) PCT Pub. No.: WO2021/210787
PCT Pub. Date: Oct. 21, 2021

(65) Prior Publication Data
US 2022/0359929 A1 Nov. 10, 2022

(30) Foreign Application Priority Data
Apr. 14, 2020 (KR) ........................ 10-2020-0045308

(51) Int. Cl.
*H01M 10/6556* (2014.01)
*H01M 10/613* (2014.01)
*H01M 10/6568* (2014.01)

(52) U.S. Cl.
CPC ..... *H01M 10/6556* (2015.04); *H01M 10/613*
(2015.04); *H01M 10/6568* (2015.04)

(58) Field of Classification Search
CPC ........... H01M 10/6556; H01M 10/613; H01M
10/6568; H01M 10/61; H01M 2220/20;
(Continued)

(56) References Cited

U.S. PATENT DOCUMENTS

2012/0129031 A1 5/2012 Kim
2012/0156543 A1 6/2012 Cicero et al.
(Continued)

FOREIGN PATENT DOCUMENTS

CN 102544619 A 7/2012
CN 208835229 U 5/2019
(Continued)

OTHER PUBLICATIONS

English translation of KR-2020001705-A (Year: 2020).*
International Search Report for PCT/KR2021/003036 dated Jul. 5,
2021. 3 pgs.

*Primary Examiner* — Ula C Ruddock
*Assistant Examiner* — Sarika Gupta
(74) *Attorney, Agent, or Firm* — Lerner David LLP

(57) ABSTRACT

A battery pack according to an embodiment of the present
disclosure includes: a plurality of battery modules; a plu-
rality of heat sinks formed on a lower side of each of the
plurality of battery modules; a first flow path that supplies a
refrigerant to each of the plurality of heat sinks; and a second
flow path that discharges the refrigerant circulated in the
plurality of heat sinks, wherein the refrigerant supplied to
each of the heat sinks circulates in a space formed between
the heat sink and the lower surface of the module frame,
respectively.

9 Claims, 6 Drawing Sheets

(58) Field of Classification Search
CPC ............. H01M 50/209; H01M 10/625; H01M
10/647; H01M 10/655; H01M 10/6551;
H01M 50/249; H01M 50/258; H01M
10/623; H01M 2220/30; H01M 50/20;
Y02E 60/10; Y02T 10/70
See application file for complete search history.

(56) References Cited

U.S. PATENT DOCUMENTS

| | | |
|---|---|---|
| 2017/0110773 A1 | 4/2017 | Pucher |
| 2017/0320381 A1 | 11/2017 | Milton et al. |
| 2017/0324128 A1 | 11/2017 | Milton et al. |
| 2017/0346146 A1 | 11/2017 | Kim |
| 2018/0241102 A1* | 8/2018 | Kim .................. H01M 10/6568 |
| 2018/0261899 A1 | 9/2018 | Milton et al. |
| 2018/0366794 A1 | 12/2018 | Kim et al. |
| 2019/0255957 A1 | 8/2019 | Milton et al. |

| | | |
|---|---|---|
| 2020/0006825 A1 | 1/2020 | Lee et al. |
| 2020/0212507 A1 | 7/2020 | Shimizu et al. |
| 2020/0254903 A1 | 8/2020 | Milton et al. |

FOREIGN PATENT DOCUMENTS

| | | | | |
|---|---|---|---|---|
| CN | 110380153 A | 10/2019 | | |
| JP | 2014504440 A | 2/2014 | | |
| JP | 2014191916 A | 10/2014 | | |
| KR | 101293971 B1 | 8/2013 | | |
| KR | 20160024187 A | 3/2016 | | |
| KR | 20170044006 A | 4/2017 | | |
| KR | 20170133178 A | 12/2017 | | |
| KR | 20180038310 A | 4/2018 | | |
| KR | 20180081996 A | 7/2018 | | |
| KR | 20190006984 A | 1/2019 | | |
| KR | 2020001705 A * | 1/2020 | .......... | H01M 10/613 |
| KR | 20200001692 A | 1/2020 | | |
| KR | 20200001705 A | 1/2020 | | |
| KR | 102086127 B1 | 3/2020 | | |
| WO | 2019-039120 A1 | 2/2019 | | |

* cited by examiner

【FIG. 1】
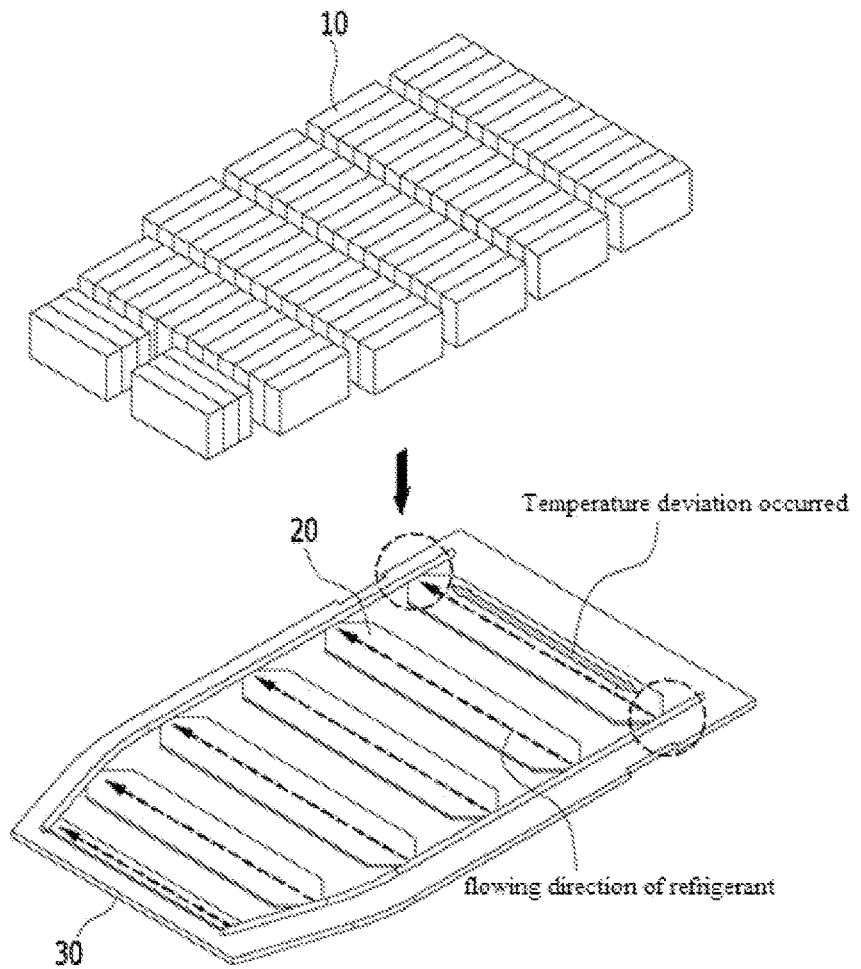
PRIOR ART

【FIG. 2】
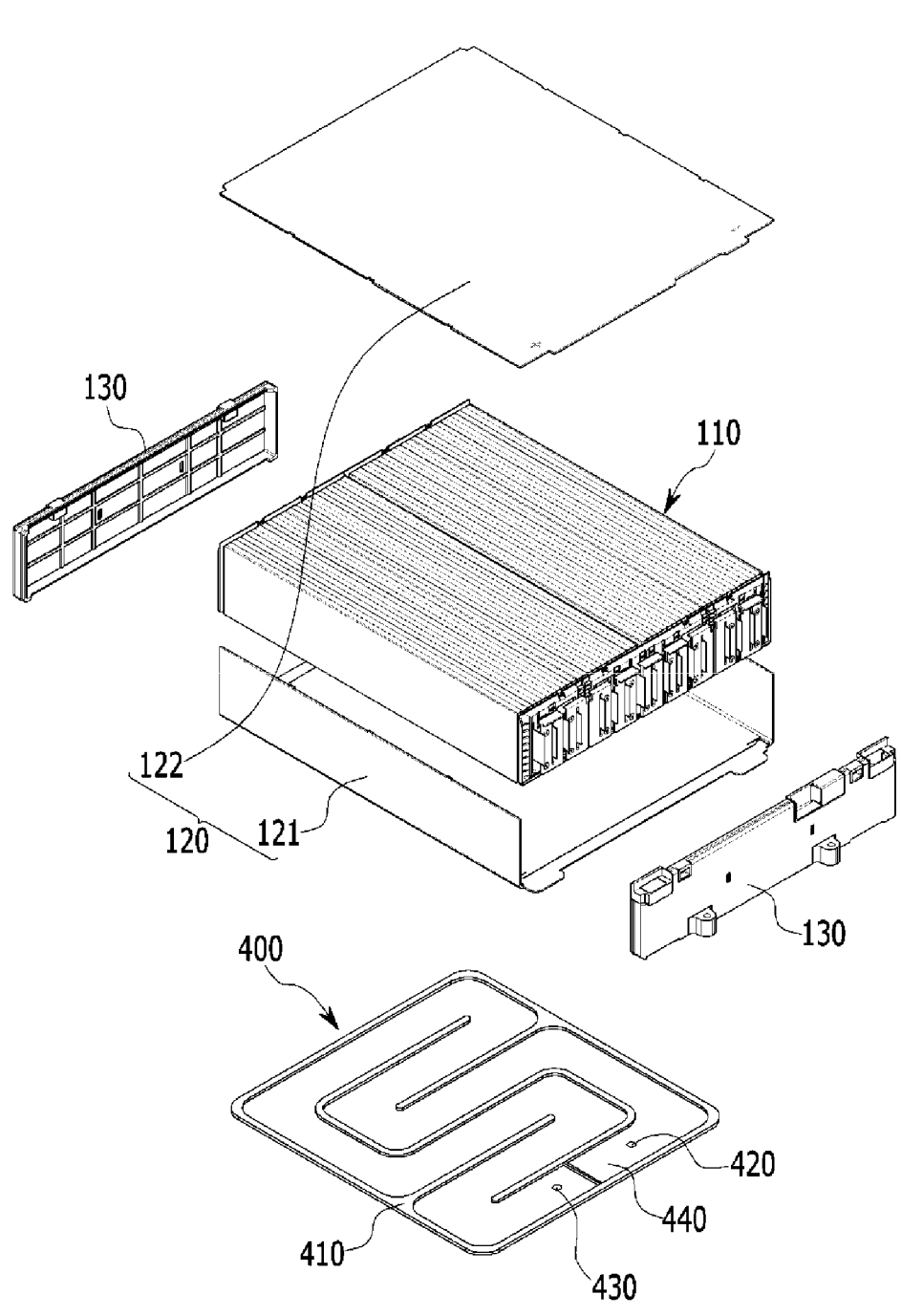

【FIG. 3】
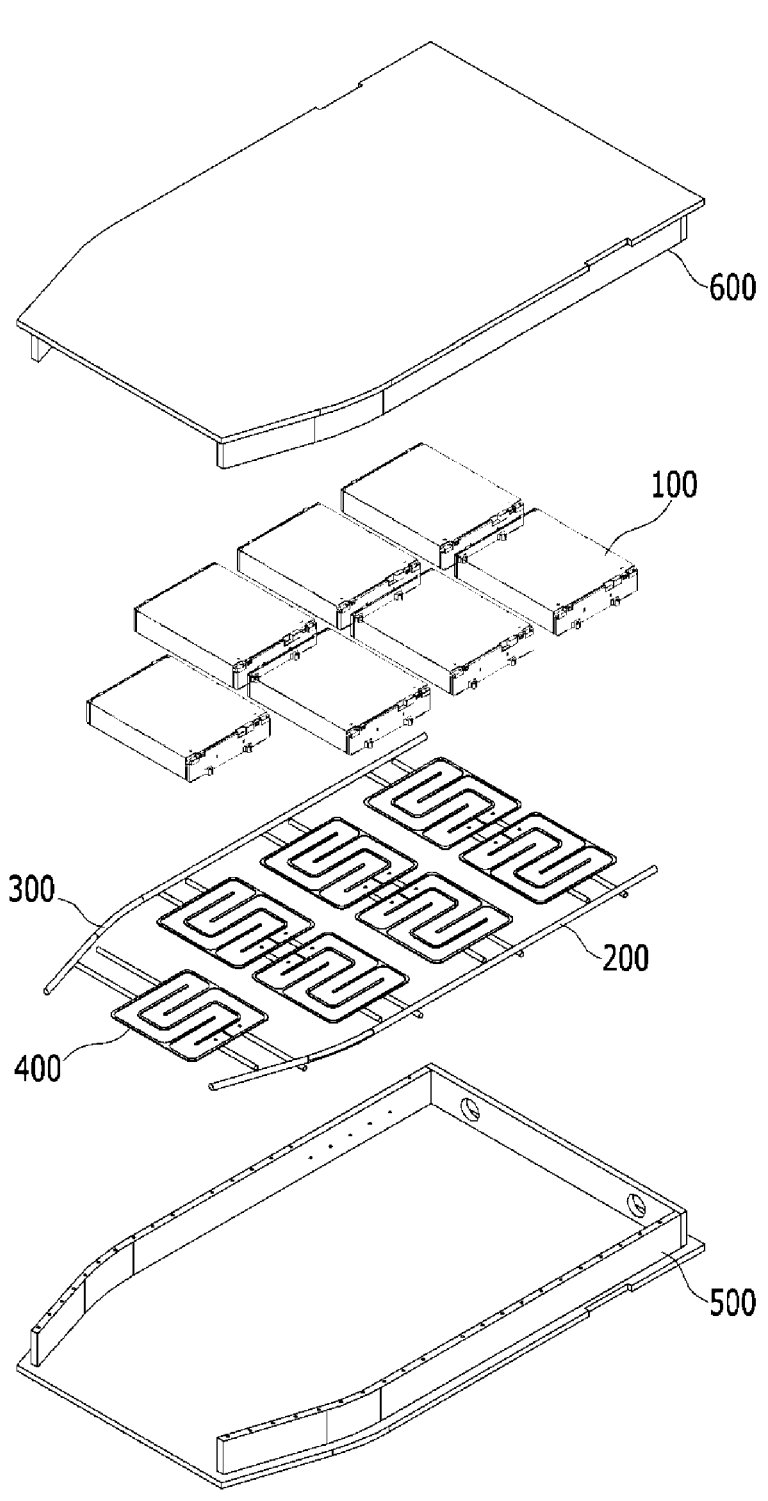

【FIG. 4】
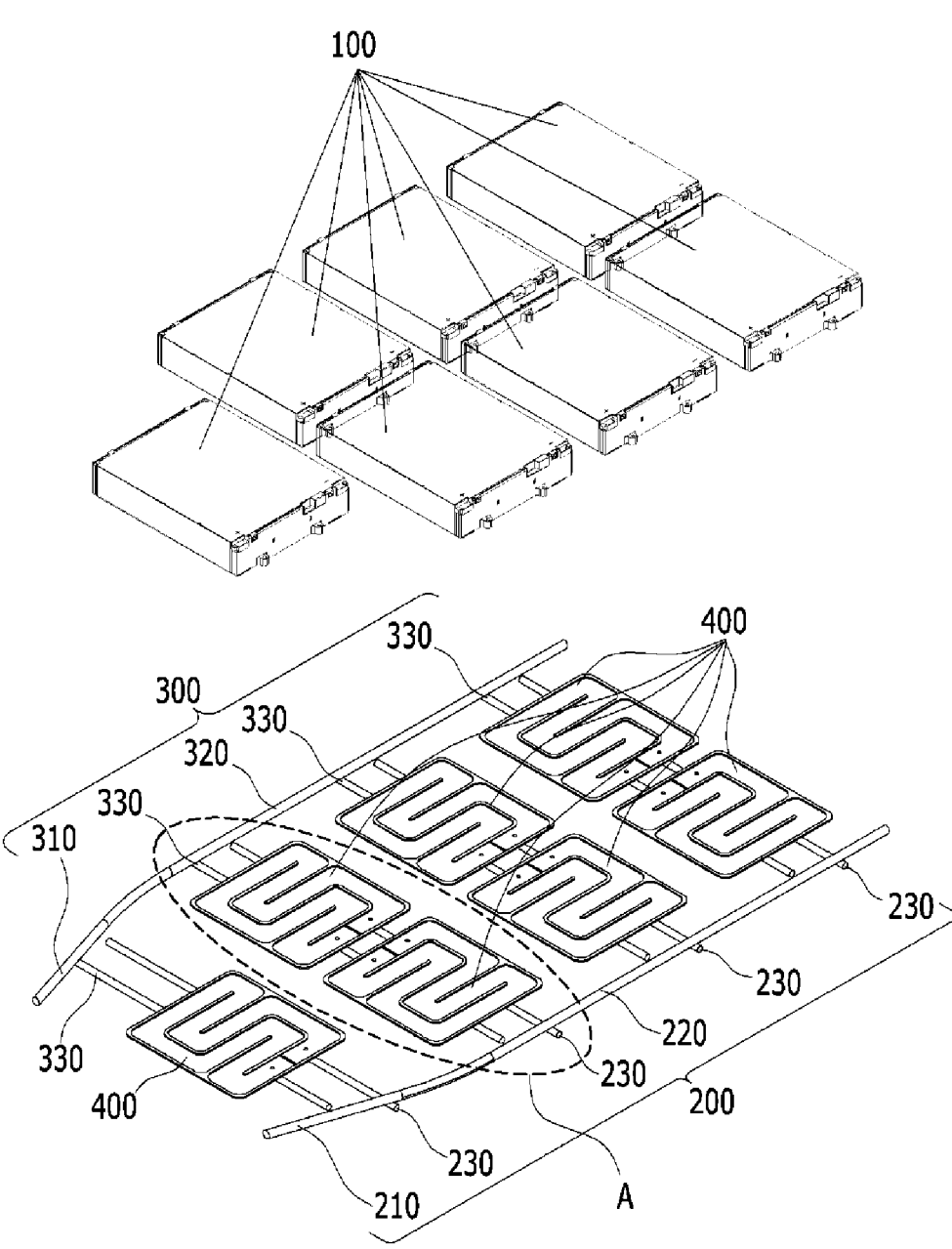

【FIG. 5】
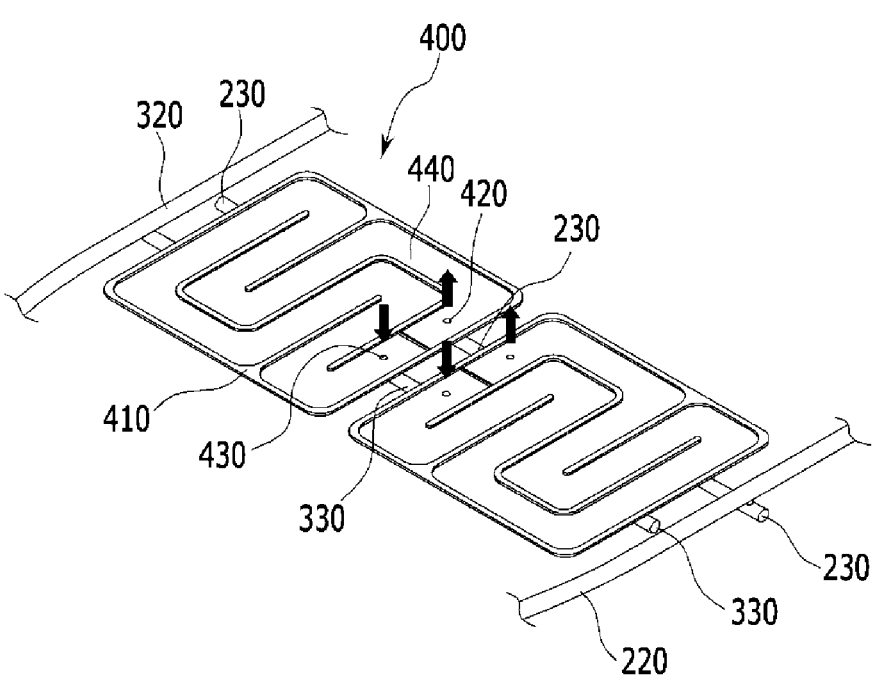

【FIG. 6】
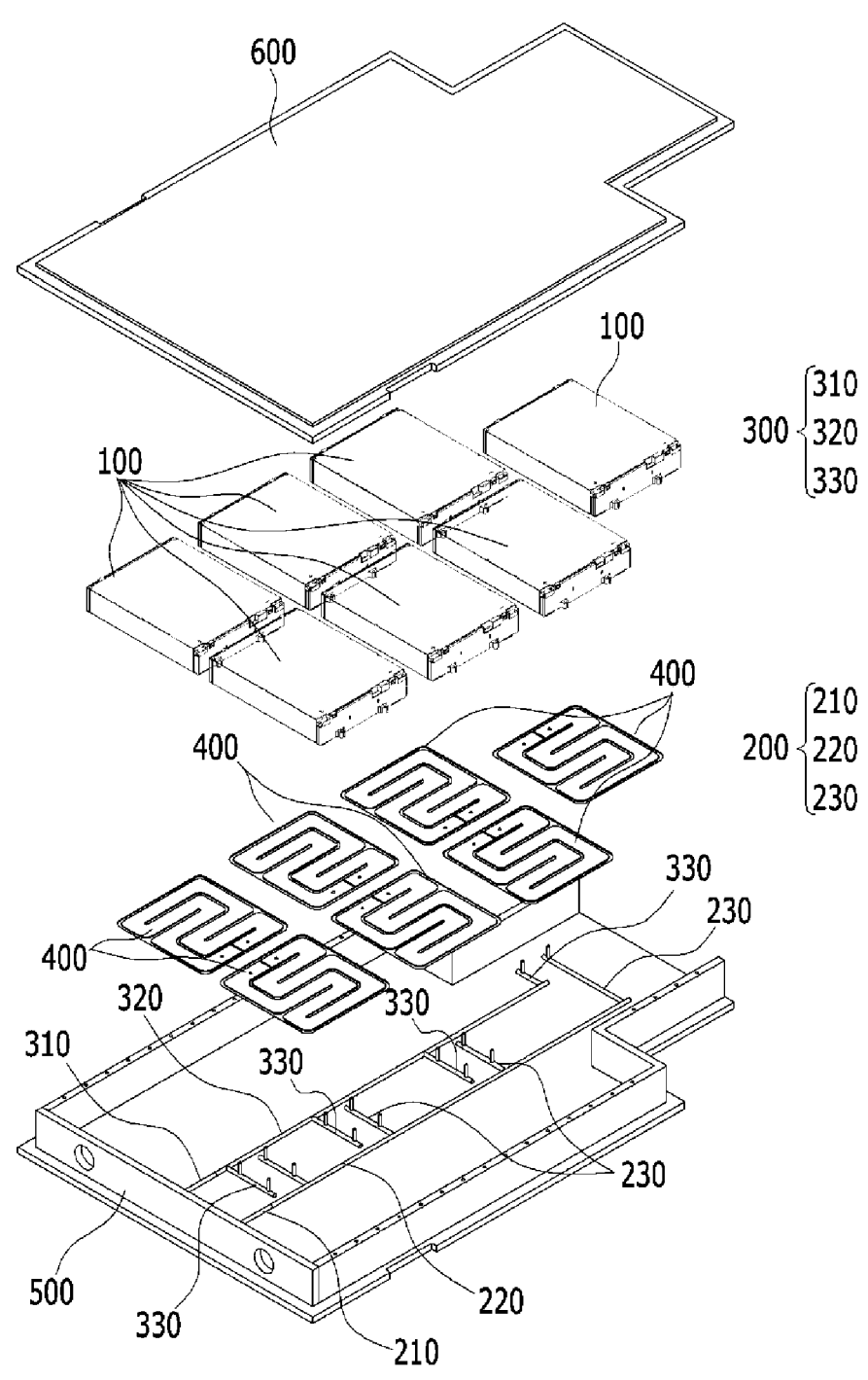

BATTERY PACK AND DEVICE INCLUDING THE SAME

CROSS-REFERENCE TO RELATED APPLICATIONS

This application is a national phase entry under 35 U.S.C. § 371 of PCT/KR2021/003036, filed on Mar. 11, 2021, which claims the benefit of Korean Patent Application No. 10-2020-0045308, filed on Apr. 14, 2020, with the Korean Intellectual Property Office, the disclosures of which are hereby incorporated by reference herein in their entireties.

TECHNICAL FIELD

The present disclosure relates to a battery pack and a device including the same, and more particularly, to a battery pack having an integrated cooling structure, and a device including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery pack includes a battery cell stack in which a plurality of battery cells are stacked, and a plurality of battery modules each including a module frame for housing the battery cell stack.

FIG. 1 is a diagram showing a conventional battery pack in which a plurality of battery modules are disposed.

Referring to FIG. 1, the conventional battery pack includes a structure in which the coolant flows along a flow path 20 to a lower side of a plurality of battery modules 10 housed in a lower housing 30. In the case of the battery pack structure shown in FIG. 1, the number of battery modules is relatively large and thus, it is difficult to individually control the temperature for each battery module, and it is simply configured so that the coolant flows to the lower side of the battery module, whereby a temperature deviation may occur between the battery module close to the inflow portion of the coolant, the battery module far from the inflow portion of the coolant, and the battery cells inside the battery module. When a temperature deviation occurs between battery modules and between battery cells, it may result in a shortened lifetime of the secondary battery.

DETAILED DESCRIPTION OF THE INVENTION

Technical Problem

It is an object of the present disclosure to provide a battery pack having an integrated cooling structure, and a device including the same.

The objects of the present disclosure are not limited to the aforementioned objects, and other objects which are not described herein should be clearly understood by those skilled in the art from the following detailed description.

Technical Solution

According to one embodiment of the present disclosure, there is provided a battery pack comprising: a plurality of battery modules each of which have a module frame; a plurality of heat sinks, each heat sink being formed on a lower surface of a respective one of the plurality of module frames such that a space for circulating coolant within the heat sink is formed between a lower surface of the heat sink and the lower surface of the module frame; a first flow path that supplies the coolant to each of the plurality of heat sinks; and a second flow path that discharges the coolant circulated in each of the plurality of heat sinks.

The first flow path may include an inlet part through which the coolant flows enters; a main supply flow path part that guides the coolant toward the plurality of heat sinks; and sub supply flow path parts that supply the coolant that has passed through the main supply flow path part to each one of the plurality of heat sinks, and the second flow path may include an outlet part through which the coolant exits; a main discharge flow path part that guides the coolant to the outlet part; and sub discharge flow path parts that discharge circulated coolant from each one of the heat sinks, to the main discharge flow path part.

The sub supply flow path parts and the sub discharge flow path parts may be formed on a lower side of the heat sinks, the sub supply flow path parts may allow the coolant to be supplied upward to the space formed between the lower surface of the heat sink and the lower surface of the module frame, and the sub discharge flow path parts may allow the coolant to be discharged downward from the space formed between the lower surface of the heat sink and the lower surface of the module frame.

The main supply flow path part and the main discharge flow path part may be disposed outside of each one of the plurality of battery modules, and the sub supply flow path parts may extend toward the main discharge flow path part, and the sub discharge flow path parts may extend toward the main supply flow path part.

The sub supply flow path parts may extend such that the sub supply flow path parts entirely pass through at least one heat sink for supplying the coolant, and the sub discharge flow path parts may extend such that the sub discharge flow path parts entirely pass through at least one heat sink that discharges the coolant to the sub discharge flow path parts.

The first flow path and the second flow path may be disposed so as to cross a lower central portion of the battery module stack.

The plurality of battery modules may be disposed in at least one row, and the sub supply flow path parts and the sub discharge flow path parts may be disposed in each row.

The plurality of battery modules may be configured such that one battery module is disposed in a portion adjacent to a portion in which the inlet part and the outlet part are formed, and other ones of the plurality of battery modules may be disposed in two rows along the main supply flow path part and the main discharge flow path part.

The battery pack may further include a lower housing that houses the plurality of battery modules, the first flow path, and the second flow path; and an upper housing that covers the plurality of battery modules, the first flow path, and the second flow path from an upper side.

According to another embodiment of the present disclosure, there is provided a device comprising the battery pack above-mentioned battery pack.

Advantageous Effects

According to embodiments of the present disclosure, in the structure of a battery pack that includes a large-area battery module having an increased number of battery cells, the coolant is supplied to the heat sinks separately formed in each of the battery modules, thereby capable of minimizing the temperature deviation between battery modules.

In addition, the cooling structure can be simplified through the cooling structure in which the module frame and the heat sink are integrated.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a conventional battery pack in which a plurality of battery modules are disposed;

FIG. 2 is an exploded perspective view showing a battery module and a heat sink coupled thereto according to an embodiment of the present disclosure;

FIG. 3 is an exploded perspective view showing a battery pack according to an embodiment of the present disclosure;

FIG. 4 is an exploded perspective view showing in more detail a structure in which a plurality of battery modules of FIG. 3 and heat sinks disposed on the lower side of respective battery modules are formed;

FIG. 5 is an enlarged view of section A of FIG. 4; and

FIG. 6 is an exploded perspective view showing a battery pack according to a modified embodiment of the present disclosure.

DETAILED DESCRIPTION OF THE EMBODIMENTS

It should be appreciated that the exemplary embodiments, which will be described below, are illustratively described to assist in the understand the present disclosure, and the present disclosure can be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, movements, constitutional elements, parts or combinations thereof, but it should be understood that they do not preclude a possibility of existence or addition of one or more other features, numbers, steps, movements, constitutional elements, parts or combinations thereof.

Below, the structure of a battery module and a heat sink, first and second flow paths coupled thereto according to one embodiment of the present disclosure will be described with reference to FIGS. 2 and 3.

FIG. 2 is an exploded perspective view showing a battery module and a heat sink coupled thereto according to an embodiment of the present disclosure. FIG. 3 is an exploded perspective view showing a battery pack according to an embodiment of the present disclosure. FIG. 4 is an exploded perspective view showing in more detail a structure in which a plurality of battery modules of FIG. 3 and heat sinks disposed on the lower side of respective battery modules are formed. FIG. 5 is an enlarged view of section A of FIG. 4.

Referring to FIGS. 2 to 5, a battery pack according to one embodiment of the present disclosure includes a battery cell stack in which a plurality of battery cells are stacked, a battery module 100 and a plurality of heat sinks 400 formed on a lower side of each of the plurality of battery modules 100. In addition, the battery pack includes a first flow path 200 that supplies a coolant to each of the plurality of heat sinks 400 and a second flow path 300 that discharges the coolant inform the plurality of heat sinks 400. The coolant that is supplied to each of the heat sinks 400 circulates in a space formed between the heat sink 400 and the bottom part of the plurality of module frames 100, respectively, before the coolant is discharged.

The plurality of battery modules 100 may include a battery cell stack 110 in which a plurality of battery cells are stacked, and a module frame 120 for housing the battery cell stack 110, respectively. The battery cell according to the embodiment of the present disclosure is a secondary battery and may be configured as a pouch-type secondary battery. Such a battery cell may be composed of a plurality of cells, and the plurality of battery cells may be stacked together so as to be electrically connected to each other, thereby forming the battery cell stack 110. Each of the plurality of battery cells may include an electrode assembly, a cell case, and an electrode lead protruding from the electrode assembly.

The module frame 120 can house the battery cell stack 110. The module frame 120 may include a lower frame 121 for covering the lower surface and both side surfaces of the battery cell stack 110, and an upper plate 122 for covering the upper surface of the battery cell stack 110. However, the structure of the module frame 120 is not limited thereto, and may be a mono frame shape surrounded by four surfaces except the front and rear surfaces of the battery cell stack 110.

The battery module 100 according to the embodiment of the present disclosure may further include end plates 130 that cover front and rear surfaces of the battery cell stack 110. The battery cell stack 110 housed inside can be physically protected through the module frame 120 described above.

The heat sink 400 may be formed at the lower part of the module frame 120. The heat sink 400 may include a lower plate 410 forming a skeleton of the heat sink 400 and contacting with the bottom part of the module frame 120, an inlet 420 formed on one side of the heat sink 400 to supply a coolant from the outside to the inside of the heat sink 400, an outlet 430 formed on one side of the heat sink to discharge the coolant from inside the heat sink to outside of the heat sink, and a flow path part 440 that connects the inlet 420 and the outlet 430 and allows the coolant to flow.

Specifically, the flow path part 440 may refer to a depressed portion of heatsink 400 defining a space between lower plate 410 and the lower surface of the lower frame 121 when battery module 100 is assembled, thereby allowing a coolant to flow through the flow path. In other words, the battery module 100 according to the embodiment of the present disclosure can have an integrated cooling structure in which the bottom part of the module frame 120 serves as to the upper plate of the heat sink 400.

Conventionally, a structure in which the coolant flows is separately formed on the lower side of the module frame and, as a result, the module frame has no choice but to cool indirectly. Thus, the cooling efficiency is reduced, and a separate coolant flowing structure is formed, which causes a problem that the space utilization rate on a battery module and a battery pack on which the battery module is mounted is deteriorated. However, according to one embodiment of the present disclosure, by adopting a structure in which the heat sink 400 is integrated with the lower part of the module frame 120, the coolant can flow directly between the flow path part 440 and the bottom part of the module frame 120, thereby increasing the cooling efficiency due to direct cooling, and through a structure in which the heat sink 400 is integrated with the bottom part of the module frame 120, the space utilization rate on a battery module and a battery pack on which the battery module is mounted can be further improved.

The lower plate 410 can be formed so as to correspond to the bottom part of the module frame 120. The bottom part of the module frame 120 corresponds to the bottom part of the lower frame 121, the lower plate 410 and the bottom part of the lower frame 121 can be coupled by welding, and the rigidity of the entire battery module can be reinforced through the lower plate 410. The lower plate 410 and the bottom part of the lower frame 121 are sealed through weld-coupling, whereby a coolant can flow without leakage in the flow path part 440 formed inside the lower plate 410.

Referring to FIG. 5, both the inlet 420 and the outlet 430 can be formed on one side of the heat sink 400. More specifically, both the inlet 420 and the outlet 430 may be formed on one side of the heat sink 400 that is formed at a portion at which the end plate 130 (FIG. 2) is located. The inlet 420 and the outlet 430 may be respectively located at both ends of one side of the heat sink 400. A coolant supply part and a coolant discharge part are formed on a lower side or an upper side of the heat sink 400, so that the coolant supplied through the coolant supply part can flow into the inlet 420, and the coolant flowing out through the outlet 430 can be discharged to the outside through the coolant discharge part.

The flow path part 440 may be formed so as to cover the bottom part of the module frame 120 while being bent. The flow path part 440 is formed in most of areas of the bottom part of the module frame 120 excluding a portion in which the lower plate 410 makes contact with the bottom part of the module frame 120, whereby all the portions of the battery cell stack 110, which are arranged so as to occupy most of areas of the bottom part of the module frame 120, can be uniformly cooled.

The portion at which the flow path part 440 is bent may be formed of a curved surface. When angled edge portions are formed in the flow path part 440, it is likely that a flow of the coolant will stagnate at the angled edge portions, thus increasing a temperature deviation and a pressure drop. In this regard, if the bending part is treated with curved surfaces as in the embodiment of the present disclosure, flowing of the coolant can be performed naturally.

According to one embodiment of the present disclosure, a plurality of heat sinks 400 may be formed on a lower side of each of the plurality of battery modules 100. The first flow path 200 supplies a coolant to each of the plurality of heat sinks 400, and the second flow path 300 discharges the coolant circulated in the plurality of heat sinks 400 to the outside.

Conventionally, a flow path for flowing the coolant is separately formed on the lower side of the plurality of battery modules, and the separately formed flow path is disposed so as to collectively pass through the lower side of the plurality of battery modules. However, in the conventional case, there was a problem that it is difficult to control the individual temperature of the battery module, and a temperature deviation occurs between the battery module and battery cells located close to the point where the coolant flows in, and the battery module and battery cells located far from the point where the coolant flows in, so that the life of the battery module may be shortened.

Accordingly, according to one embodiment of the present disclosure, a structure is adopted in which a plurality of heat sinks 400 are integrally formed on a lower side of each of the plurality of battery modules 100, and coolant is supplied to each of the plurality of heat sinks 400 through the first flow path 200, thereby capable of minimizing the temperature deviation between the battery module and the battery cells, and increasing the life of the battery module and the battery pack.

Further, as in the embodiment of the present disclosure, in the case of a large-area module in which the number of stacked battery cells is larger than the number of battery cells of FIG. 1 instead of having a larger size than the battery module of FIG. 1, the number of battery modules inserted into the battery pack of the same volume can be reduced compared to the number of battery modules shown in FIG. 1, thereby further simplifying the coolant supply structure supplied to each battery module.

Below, a coolant supply and discharge structure according to one embodiment of the present disclosure will be described with reference to FIGS. 3 to 5.

FIG. 4 is an exploded perspective view showing in more detail a structure in which a plurality of battery modules of FIG. 3 and heat sinks disposed on the lower side of respective battery modules are formed. FIG. 5 is an enlarged view of section A of FIG. 4.

Referring to FIGS. 3 to 5, the first flow path 200 according to one embodiment of the present disclosure may include an inlet part 210 through which the coolant flows in; a main supply flow path part 220 that guides the flowed-in coolant; and a plurality of sub supply flow path parts 230 that respectively supply the coolant that has passed through the main supply flow path part 220, to the heat sinks 400. Further, the second flow path 300 according to one embodiment of the present disclosure may include an outlet part 310 through which the coolant flows out, a main discharge flow path part 320 that guides the coolant to the outlet part 310, and a sub discharge flow path part 330 that discharges the coolant circulated in the heat sink 400, to the main discharge flow path part 320.

At this time, the sub supply flow path part 230 and the sub discharge flow path part 330 may be formed on the lower side of the heat sinks 400, the sub supply flow path part 230 allows the coolant to be supplied upward to a space between the heat sink 400 and the bottom part of the module frame 120, and the sub discharge flow path part 330 may be discharged downward from the space between the heat sink 400 and the bottom part of the module frame.

As a result, the coolant that has flowed in through the inlet part 210 passes through the main supply flow path part 220 and the sub supply flow path part 230 in this order, and are supplied through the inlet 420 of the heat sinks 400 located below the battery modules 100, respectively. The supplied coolant circulates inside the heat sink 400 through the flow path 440 formed in each heat sink 400, and the coolant whose circulation is completed passes through the outlets 430 of the heat sinks 400, passes through the sub discharge flow path part 330 and the main discharge flow path part 320 in this order, and is discharged to the outside of the battery pack through the outlet 310.

According to one embodiment of the present disclosure, the main supply flow path part 220 and the main discharge flow path part 320 may be respectively disposed outside the plurality of battery modules 100, the sub supply flow path part 230 may be extendedly formed toward the main discharge flow path part 320, and the sub discharge flow path part 330 may be extendedly formed toward the main supply flow path part 220. At this time, the sub supply flow path part 230 is extendedly formed so that the sub supply flow path part 230 entirely passes through at least one heat sink 400 for supplying a coolant, and the sub discharge flow path part 330 may be extendedly formed so as to entirely pass through at least one heat sink 400 that discharges the coolant to the sub discharge flow path part 330.

The sub supply flow path part 230 is extendedly formed so as to pass through the inlet 420 of the heat sink 400 and reach the portion where the main discharge flow path part 320 is located, thereby capable of supporting the load of at least one heat sink 400 and the battery module 100 located on the upper side.

The plurality of battery modules 100 may be disposed in at least one row, and the sub supply flow path part 230 and the sub discharge flow path part 330 may be disposed in each row. According to the embodiment of the present disclosure, the plurality of battery modules 100 may be configured such that one battery module 100 is disposed in a portion adjacent to a portion in which the inlet part 210 and the outlet part 310 are formed, and then, the plurality of battery modules may be disposed in two rows along the main supply flow path part 220 and the main discharge flow path part 320.

According to one embodiment of the present disclosure, the battery pack of claim may further include a lower housing 500 that houses the plurality of battery modules 100, the first flow path 200, and the second flow path 300, and an upper housing 600 that covers the plurality of battery modules 100, the first flow path 200, and the second flow path 300 from an upper side.

Below, a battery pack according to a modified embodiment of the present disclosure will be described with reference to FIG. 6.

Referring to FIG. 6, the battery pack according to the modified embodiment of the present disclosure may be disposed so that the first flow path 200 and the second flow path 300 cross the lower central portion of the battery module assembly. It is possible to implement a battery pack having an arrangement structure of the first and second flow paths 200 and 300 modified in various forms in this way.

The battery pack according to embodiments of the present disclosure may have a structure in which one or more of the battery modules according to this embodiment are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although the invention has been shown and described with reference to the preferred embodiments, the scope of the present disclosure is not limited thereto, and numerous other modifications and embodiments can be devised by those skilled in the art that will fall within the spirit and scope of the invention described in the appended claims. Further, these modified embodiments should not be understood individually from the technical spirit or perspective of the present disclosure.

DESCRIPTION OF REFERENCE NUMERALS

100: battery module
110: battery cell stack
120: module frame
121: lower frame
122: upper plate
130: end plate
200: first flow path
210: inlet part
220: main supply flow path part
230: sub supply flow path part
300: second flow path
310: outlet part
320: main discharge flow path part
330: sub discharge flow path part
400: heat sink
500: lower housing
600: upper housing

The invention claimed is:

1. A battery pack comprising:
a plurality of battery modules each of which has an individual respective module frame covering an upper surface, a lower surface, and side surfaces of a respective battery cell stack;
a plurality of heat sinks, each heat sink being formed on a lower surface of a respective one of the plurality of module frames such that a space for circulating coolant within the heat sink is formed between and in communication with a lower surface of the heat sink and an upper surface of the heat sink that is the lower surface of the module frame;
a first flow path that supplies the coolant to each of the plurality of heat sinks; and
a second flow path that discharges the coolant circulated in each of the plurality of heat sinks,
wherein the first flow path comprises a main supply flow path part disposed outside of each of the battery modules, and sub supply flow path parts extending toward a main discharge flow path part,
wherein the second flow path comprises the main discharge flow path part that is disposed outside of each of the battery modules, and sub discharge flow path parts extending toward the main supply flow path part, and
wherein the sub supply flow path parts and the sub discharge flow path parts are disposed underneath a lower side of the heat sinks opposite from the upper surfaces of the heat sinks that are lower surfaces of the module frames, the sub supply flow path parts and the sub discharge flow path parts being configured to support the plurality of heat sinks and the plurality of battery modules.

2. The battery pack of claim 1, wherein the first flow path further includes an inlet part through which the coolant enters and the second flow path further includes an outlet port through which the coolant exits, wherein the main supply flow path part guides the coolant flowing in from the inlet part, and the sub supply flow path parts supply the coolant that has passed through the main supply flow path part to each one of the plurality of heat sinks, and wherein the main discharge flow path part guides the coolant to the outlet part, and sub discharge flow path parts discharge circulated coolant from each one of the heat sinks to the main discharge flow path part.

3. The battery pack of claim 2, wherein:

the sub supply flow path parts allows the coolant to be supplied upward to the space formed between the lower surface of the heat sink and the lower surface of the module frame, and the sub discharge flow path parts allow the coolant to be discharged downward from the space formed between the lower surface of the heat sink and the lower surface of the module frame.

4. The battery pack of claim 1, wherein:

the sub supply flow path parts extend such that the sub supply flow path parts entirely pass through at least one heat sink for supplying the coolant, and the sub discharge flow path parts extend such that the sub discharge flow path parts entirely pass through at least one heat sink that discharges the coolant to the sub discharge flow path parts.

5. The battery pack of claim 1, wherein:

the first flow path and the second flow path are disposed so as to cross a lower central portion of the battery module stack.

6. The battery pack of claim 1, wherein:

the plurality of battery modules are disposed in at least one row, and the sub supply flow path parts and the sub discharge flow path parts are disposed in each row.

7. The battery pack of claim 6, wherein:

the plurality of battery modules are configured such that one battery module is disposed in a portion adjacent to a portion in which the inlet part and the outlet part are formed, and other ones of the plurality of battery modules are disposed in two rows along the main supply flow path part and the main discharge flow path part.

8. The battery pack of claim 1, further comprising a lower housing that houses the plurality of battery modules, the first flow path, and the second flow path; and an upper housing that covers the plurality of battery modules, the first flow path, and the second flow path from an upper side.

9. A device comprising the battery pack of claim 1.

* * * * *